(12) United States Patent
Stephan

(10) Patent No.: US 7,915,546 B2
(45) Date of Patent: Mar. 29, 2011

(54) MULTI-FUNCTION LIGHT SWITCH WITH EXTENDABLE MODULE

(75) Inventor: Joerg Stephan, Pulheim (DE)

(73) Assignee: Ford Global Technologies, LLC, Dearborn, MI (US)

( * ) Notice: Subject to any disclaimer, the term of this patent is extended or adjusted under 35 U.S.C. 154(b) by 296 days.

(21) Appl. No.: 12/367,122

(22) Filed: Feb. 6, 2009

(65) Prior Publication Data

US 2010/0032266 A1 Feb. 11, 2010

(30) Foreign Application Priority Data

Feb. 7, 2008 (DE) .......................... 10 2008 007 930

(51) Int. Cl.
*H01H 9/00* (2006.01)
(52) U.S. Cl. .............. 200/5 R; 200/4; 200/14; 200/17 R
(58) Field of Classification Search .............. 200/4, 5 R, 200/14, 17 R, 18, 61.54, 566, 329, 336; 307/9.1, 307/10.1, 10.8; 341/35; 345/184
See application file for complete search history.

(56) References Cited

U.S. PATENT DOCUMENTS

| 4,394,546 | A  | * | 7/1983  | Harumatsu ................... 200/5 R |
| 6,288,492 | B1 | * | 9/2001  | Wolfe ............................. 315/82 |
| 6,410,866 | B1 | * | 6/2002  | Klein et al. .................... 200/5 R |
| 6,667,446 | B1 | * | 12/2003 | Schuberth et al. ................ 200/4 |
| 7,119,290 | B2 | * | 10/2006 | Kim ................................ 200/5 R |
| 7,297,889 | B2 | * | 11/2007 | Bornhorst et al. ............ 200/336 |
| 7,579,559 | B2 | * | 8/2009  | Schelbert et al. ................. 200/4 |
| 7,741,571 | B2 | * | 6/2010  | Hostmann et al. .............. 200/18 |
| 7,745,749 | B2 | * | 6/2010  | Ito ................................. 200/336 |

FOREIGN PATENT DOCUMENTS

DE 199 36 385 2/2001

* cited by examiner

*Primary Examiner* — Michael A Friedhofer
(74) *Attorney, Agent, or Firm* — Frank A. MacKenzie; Brooks Kushman P.C.

(57) ABSTRACT

A multi-function light switch unit mountable to an interior panel of an automotive vehicle has a rotatable outer ring controlling a main headlamp, two pushbutton panels within the outer ring controlling additional lights, and an extendable module within the outer ring having at two rotary controllers for controlling other lights. The extendable module is movable with between an extended position wherein it projects from the front surface of the light switch unit such that the rotary controllers are exposed in a manually operative position in front of the push button panels, and a retracted position wherein the rotary controllers are behind the front surface of the light switch unit.

16 Claims, 1 Drawing Sheet

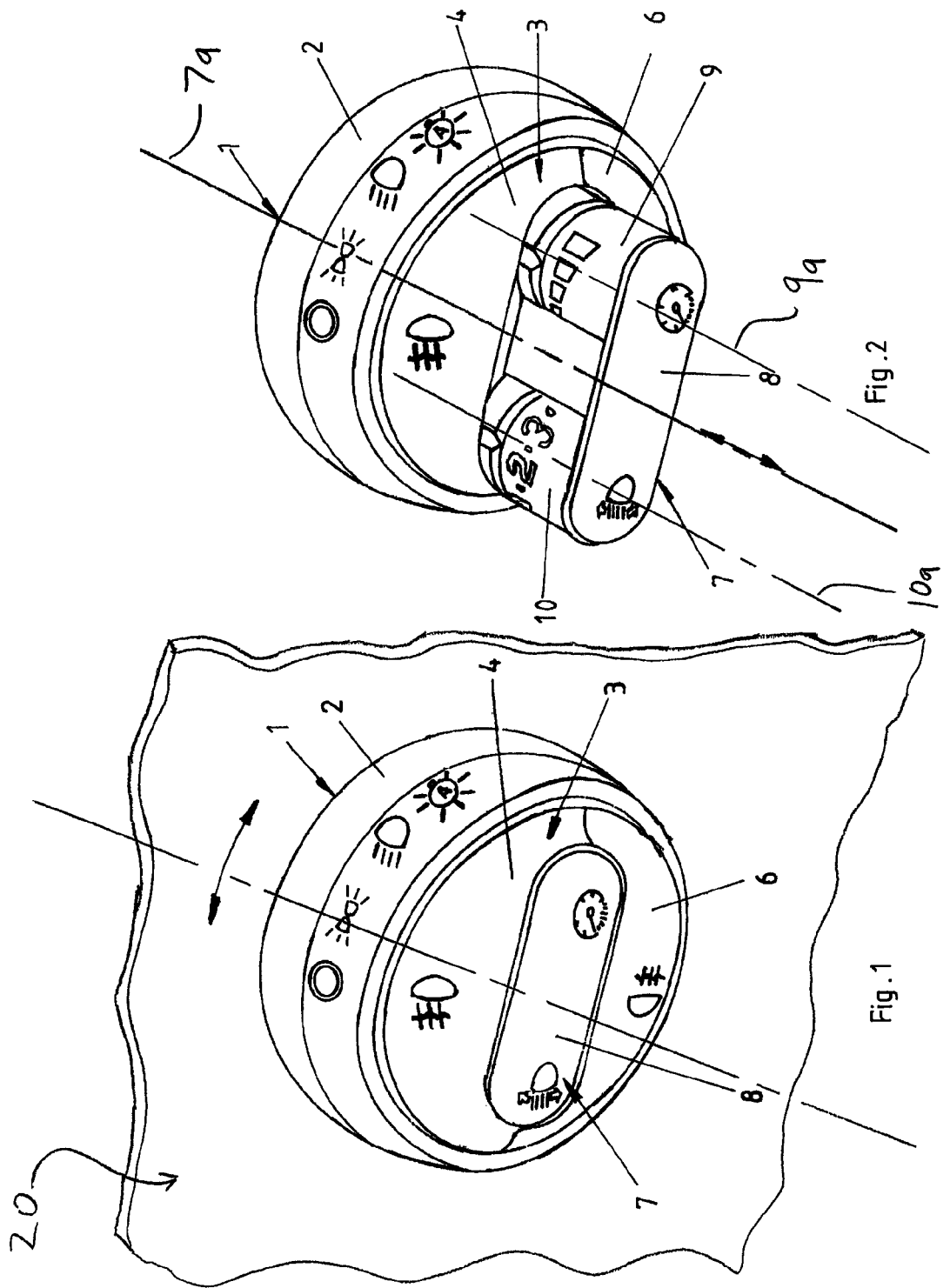

MULTI-FUNCTION LIGHT SWITCH WITH EXTENDABLE MODULE

CROSS-REFERENCE TO RELATED APPLICATION

This application claims foreign priority benefits under 35 U.S.C. §119(a)-(d) to DE 10 2008 007 930.8, filed Feb. 7, 2008 which is hereby incorporated by reference in its entirety.

BACKGROUND

1. Field

The invention relates to electric switches for adjusting lights of automotive vehicles, and more specifically to such a switch having plurality of switching functions for activating several different lighting groups 2. Background Art The number of electrically operated devices and systems in automotive vehicles has increased in recent years and continues to do so. It is therefore increasingly important to provide controls for a multitude of systems that may be simply and conveniently operated by the driver (or other occupant) of the vehicle. Due to limitations on the amount of surface area of available on instrument panels and other consoles within the driver's reach, the designers of vehicle interiors have found it necessary to provide light switch units that incorporate the controls for two or more electrical system into a single, relatively small unit.

Light switch units adapted to permit the control of more than one system have been utilized in the control of vehicle lighting systems. German patent publication DE 19936385 A1 teaches a headlamp control switch unit having a rotary switch and one or more pushbutton switches.

There is a need for a multi-function light switch unit that is efficient in terms of utilization of installation space and that is configured such that the individual switching functions are, despite the extremely compact design, laid out in a clearly organized arrangement. The light switch must further be easily manipulated by a driver of the vehicle to operate the various lights.

SUMMARY

In an embodiment of the invention, a multi-function light switch unit for an automotive vehicle comprises an outer manually rotatable ring for controlling a main headlamp, a pushbutton area disposed within the outer ring and having at least one manually operable switch for controlling at least one additional light, and at least one extendable module disposed within the outer ring and adjacent to the pushbutton area. The extendable module is movable with respect to the pushbutton area between an extended position and a retracted position. In the extended position it projects from a front surface of the pushbutton area such that one or more hide-away switches are in an exposed position in which it can be manipulated by the vehicle driver to adjust another light or group of lights. When the extendable module is in the retracted position, the at least one hide-away switch is substantially concealed behind the front surface of the pushbutton area.

This configuration of a multi-function light switch thereby provides an increased number of light control functions and which is particularly efficient in terms of utilization of installation space, while still affording a particularly clearly organized arrangement and method of controlling the multiple lighting functions.

According to a further feature of the disclosed embodiment, the pushbutton area comprises two pushbutton panels, each of which may be a two-state, momentary-contact switch of the type which moves between two different planes when manually actuated.

According to a further feature of the disclosed embodiment, the extendable module comprises a contact plate that when in the retracted position lies generally flush with the front surface of the pushbutton area.

According to a further feature of the disclosed embodiment, the extendable module is latched in the retracted position and spring-loaded to the extended position.

According to a further feature of the disclosed embodiment, the at least one hide-away switch comprises two rotary controllers having parallel rotation axes disposed parallel to a retraction-extension axis of the extendable module.

BRIEF DESCRIPTION OF THE DRAWINGS

A preferred exemplary embodiment of the invention is illustrated schematically in the drawing, in which:

FIG. 1 illustrates a light switch unit with a extendable module in a retracted position, and FIG. 2 illustrates the light switch unit of FIG. 1 with the extendable module in an extended position.

DETAILED DESCRIPTION OF THE EMBODIMENT(S)

FIGS. 1 and 2 illustrate a multi-function light switch unit 1 for automotive vehicles. Light switch unit 1 is shown mounted on a vehicle interior panel 20 within a passenger compartment of the vehicle, and is preferably located at a position within easy reach of the vehicle driver. As will be explained in further detail, light switch unit 1 includes a plurality of manually operable switching functions for selecting operational modes of different lights or lighting groups of the vehicle.

Light switch unit 1 has an outer ring 2 that is rotatable relative to panel 20, as well as to the balance of the light switch unit. Rotation of outer ring 2 may, for example, control the main headlamps of the vehicle and so will have a plurality of settings for the different available operational modes of the main headlamps. As indicated by the symbols marked on outer ring 2 in FIGS. 1 and 2, such main headlamp settings may include an OFF setting, a parking light setting, a low-beam/high-beam headlamp setting, and an "auto-lamp" setting. Switch positions for selecting other settings or modes may also be provided, such as for a "left parking light only" and "right parking light only." Light switch unit 1 may include an interior light source (not shown) for illuminating the symbols on outer ring 2, as is well known in field of automotive vehicle interiors.

A pushbutton area 3 is located inside of and substantially surrounded by outer ring 2. Pushbutton area 3 includes at least one switch for controlling additional lights or light groups of the vehicle. In the illustrated embodiment, pushbutton area 3 is subdivided into two pushbutton panels 4, 6, but pushbutton area may incorporate any number of panels. Pushbutton panels 4, 6 together form or define a front surface of light switch unit 1. In the depicted embodiment, markings on pushbutton panels 4, 6 indicate that the upper panel 4 controls forward fog lamps and lower panel 6 controls rear fog lamps, as indicated by the commonly-accepted international symbols. The two panels 4, 6 may be of equal size, each subtending approximately one half of the circumference of the circular face of light switch unit 1, but pushbutton area 3 may be divided in any manner as required to control the desired number of additional lights.

Pushbutton panels 4, 6, may be two-state, momentary-contact switches of the type which move between two different planes when manually actuated. The type of switches used will depend upon the operating modes of the additional lights being controlled by panels 4, 6.

An extendable module 7 is disposed within outer ring 2, and is movable along a retraction-extension axis 7*a* between the retracted position shown in FIG. 1 and the extended position shown in FIG. 2. In the illustrated embodiment, EM 7 is centrally located with respect to outer ring 2 and is surrounded by pushbutton panels 4, 6. EM 7 comprises a contact plate 8 and two hide-away switches 9, 10 disposed behind the back surface of the contact plate.

In the present description the terms "front," "forward," "back," "rear," "behind," and similar terms, when used in reference to light switch unit 1, are used as follows: The front of light switch unit 1 or any component thereof is that side facing outwardly from panel 20 and presented to a person operating the switches. The back side of light switch unit 1 or any component thereof is the side oriented toward panel 20 and opposite from the front side.

Hide-away switches 9, 10 are manually actuatable by the driver, when in the extended position, to control additional vehicle lights. In the depicted embodiment, markings on contact surface 8 indicate that hide-away switches 9, 10 control instrument panel lighting and headlamp beam width respectively. It is to be understood that hide-away switches 9, 10 may control any desired and appropriate vehicle lighting system.

Hide-away switches 9, 10 may be rotary controllers. Further, hide-away switches 9, 10 may have respective rotational axes 9*a*, 10*a* disposed substantially parallel to one another and to the extendable module retraction-extension axis 7*a*.

As stated above, EM 7 is linearly movable along retraction-extension axis 7*a*. This may advantageously be achieved by a spring-loaded, two-position latch mechanism (not shown) which retains the EM in the retracted position until a momentary press-and-release by the driver releases the latch. When the latch is released a spring (not shown) urges EM 7 to the extended position. EM 7 is returned to the retracted position by pressing on contact plate 8 until the latch mechanism reengages.

EM 7 preferably remains latched in the retracted position at all times other than when the vehicle driver desires to adjust the lights controlled by hide-away switches 9, 10. In the retracted position, contact surface 8 may lie generally flush with the front surface of the surrounding pushbutton area 3. The term "generally flush" means that the adjacent edges of the two surfaces are within approximately 4 millimeters of being co-planar with one another. Alternatively, contact surface 8 may be recessed or project with respect to pushbutton area 3. In order to adjust hide-away switches 9, 10, the driver presses gently on contact surface 8 to release the spring-loaded latch, allowing extendable module 7 to move, under spring pressure, to the extended position. In the extended position, hide-away switches 9, 10 are exposed and in a manually operable position where they are easily manipulated by the driver to change the light settings as desired. The driver then presses gently on contact surface 8 to return EM7 to the retracted position where it is retained by the latch.

In the illustrated embodiment, light switch unit 1 is preferably installed in mounting panel 20 such that hide-away switches 9, 10 are disposed in a side-by-side horizontal arrangement such that when extendable module 7 is in the extended position both the switches can be viewed by the driver, if necessary, during actuation.

Pushbutton switches 4, 6 and contact surface 8 of extendable module 7 may be provided with symbols identifying their respective switching functions. The symbols may also be illuminated if necessary.

What is claimed:

1. A multi-function light switch unit for an automotive vehicle comprising:
   an outer ring manually rotatable between a plurality of positions to control a main headlamp;
   a pushbutton area disposed within the outer ring and having at least one manually operable switch to control at least one additional light; and
   at least one extendable module disposed within the outer ring and adjacent to the pushbutton area and movable with respect to the pushbutton area between an extended position wherein the at least one extendable module projects from a front surface of the pushbutton area such that at least one hide-away switch is exposed in a manually operative position, and a retracted position wherein the at least one hide-away switch is substantially concealed behind the front surface of the pushbutton area.

2. The apparatus according to claim 1, wherein the at least one extendable module comprises a contact plate lying generally flush with the front surface of the pushbutton area when in the retracted position.

3. The apparatus according to claim 1, wherein the at least one extendable module is latched in the retracted position and spring-loaded to the extended position.

4. The apparatus according to claim 1, wherein the pushbutton area comprises two independently operable pushbutton panels.

5. The apparatus according to claim 4, wherein the extendable module is disposed between the two pushbutton panels.

6. The apparatus according to claim 1, wherein the at least one hide-away switch comprises a rotary controller.

7. The apparatus according to claim 6, wherein the at least one rotary controller has a rotation axis disposed parallel to a retraction-extension axis of the extendable module.

8. The apparatus according to claim 7, wherein the at least one hide-away switch comprises two rotary controllers having parallel rotation axes.

9. A multi-function light switch unit for an automotive vehicle comprising:
   an outer ring manually rotatable between a plurality of positions to control a main headlamp;
   at least two pushbutton panels disposed within the outer ring and independently operable to control at least first and second additional lights; and
   an extendable module disposed within the outer ring and comprising a contact plate and at least two rotary controllers disposed adjacent a back surface of the contact plate, the extendable module movable with respect to the pushbutton panels along a retraction-extension axis between an extended position wherein the extendable module projects from a front surface of the pushbutton panels and the at least two rotary controllers are exposed in a manually operative position in front of the push button panels, and a retracted position wherein the at least two rotary controllers are behind the front surface of the pushbutton panels.

10. The apparatus according to claim 9, wherein when the extendable module is in the retracted position, the contact plate is generally flush with and surrounded by the at least two pushbutton panels.

11. The apparatus according to claim 9, wherein the at least two rotary controllers each have a rotation axis disposed parallel to the retraction-extension axis of the extendable module.

12. The apparatus according to claim 9, wherein the at least one extendable module is latched in the retracted position and spring-loaded to the extended position.

13. A multi-function light switch unit mounted to an interior panel of an automotive vehicle comprising:
 an outer ring manually rotatable relative to the interior panel between a plurality of positions to control a main headlamp;
 at least two pushbutton panels disposed within the outer ring and forming a front surface of the light switch unit, each of the at least two pushbutton panels independently operable to control at least first and second additional lights; and
 an extendable module disposed within the outer ring, the extendable module comprising a contact plate oriented generally parallel with the front surface of the light switch unit and at least two rotary controllers disposed adjacent a back surface of the contact plate, the extendable module movable with respect to the interior panel between an extended position wherein the extendable module projects from the front surface of the light switch unit and the at least two rotary controllers are exposed in a manually operative position in front of the push button panels, and a retracted position wherein the at least two rotary controllers are behind the front surface of the light switch unit.

14. The apparatus according to claim 13, wherein when the extendable module is in the retracted position, the contact plate is generally flush with the front surface of the light switch unit.

15. The apparatus according to claim 13, wherein the at least two rotary controllers each have a rotation axis disposed parallel to a retraction-extension axis of the extendable module.

16. The apparatus according to claim 13, wherein the at least one extendable module is latched in the retracted position and spring-loaded to the extended position.

* * * * *